US005681377A

United States Patent [19]
Lohr et al.

[11] Patent Number: 5,681,377
[45] Date of Patent: Oct. 28, 1997

[54] WAX-FREE FURNITURE POLISH WITH SILICONE COMPONENTS

[76] Inventors: Robert H. Lohr, 1006 Hialeah Dr., Racine, Wis. 53402; Phillip J. Uebe, 3110 Maurice Dr., Union Grove, Wis. 53182

[21] Appl. No.: 575,941

[22] Filed: Dec. 20, 1995

[51] Int. Cl.$^6$ .................................................. C09G 1/16
[52] U.S. Cl. .......................... 106/3; 106/3; 106/287.14
[58] Field of Search ........................... 106/3, 11, 287.14

[56] References Cited

U.S. PATENT DOCUMENTS

| | | | |
|---|---|---|---|
| 3,965,518 | 6/1976 | Muoio | 427/270 |
| 5,112,394 | 5/1992 | Miller | 106/3 |
| 5,443,760 | 8/1995 | Kasprzak | 252/302 |
| 5,531,814 | 7/1996 | Bahr et al. | 106/11 |

*Primary Examiner*—Melissa Bonner
*Attorney, Agent, or Firm*—Laura L. Bozek

[57] ABSTRACT

A wax-free silicone containing furniture polish is prepared using 1) a low viscosity silicone fluid and a silicone gum; or 2) a low visosity silicone fluid and a polydiorganosiloxane; or 3) a low visocity silicone fluid, a silicone gum, and a polydiorganosiloxane together with water and one or more suitable surfactants.

11 Claims, No Drawings

1

WAX-FREE FURNITURE POLISH WITH SILICONE COMPONENTS

TECHNICAL FIELD

The present invention is directed to improved, wax-free furniture polish compositions in the form of liquids, aerosols, creams and lotions. These compositions contain a mixture of silicone compounds including low viscosity silicone fluids with a viscosity of about 5–5,000 centistokes, with added silicone gums, and/or polydiorganosiloxanes. Conventional furniture polish ingredients such as hydrocarbon solvents, water, emulsifiers, fragrance, colors and preservatives may also be included.

BACKGROUND ART

Most furniture has a lacquer coating or "film" on certain portions of its external surfaces. Those skilled in the art know that conventional furniture polishes form at least one additional fill layer on top of the furniture lacquer coating or fill. "Smearing" of a polished furniture surface occurs when a shearing force is applied to an area or region along the surface of the furniture polish film layer.

"Smears" can be caused by such factors as the diffusion of reflected light rays, the exposure of the underlying substrate surface, and so forth.

The ability of a polished furniture surface (i.e., the furniture polish fill layer) to return to its original appearance after being smeared, and the amount of time required to return the furniture polish fill layer to its original appearance, are two factors which tend to be important in evaluating the performance of any furniture polish composition or formulation.

Furniture polish compositions or formulations possessing superior smear recovery properties have long been desired. Commercially-available silicone-containing furniture polishes, however, and in particular the surface-applied films they produce, typically lack this particular quality. Indeed, many conventional dimethyl silicones tend to deposit films which exhibit "bronzing" i.e., a tendency to streak. Moreover, many dimethyl silicones, which are commonly found in furniture polishes, are liquid and naturally tend to smear.

To reduce "bronzing", formulators of a number of presently commercially-available furniture polishes in-corporate certain additives—such as waxes, oils and/or surfactants—into many of their dimethyl silicone-containing furniture polish formulations. The addition of such additives to a furniture polish formulation, however, often produces undesirable effects. For example, the addition of wax to such a polish formulation generally reduces the ability of the resultant polish film to exhibit total smear recovery; while the addition of oil and/or surfactant tends to make a smear more visible, which is generally undesirable.

Thus, commercial furniture polishes that use conventional silicone-containing or conventional silicone-based fluids, as well as certain conventional waxes, surfactants and/or certain oils, seemingly initially tend to provide certain desirable surface-appearance values but, in fact, ultimately suffer from a variety of inherent disadvantages.

Efforts have been made to overcome these known disadvantages of prior art silicone containing furniture polishes. An example of such a composition is found in Miller, U.S. Pat. No. 5,112,394 which discloses a furniture polish concentrate containing dimethyl silicone and a poly(dimethyl)-copoly(methyl, oxygen containing) siloxane copolymer.

Furniture polish compositions based on silicone oils also suffer from a phenomenon known as "mottling". Silicone oils tend to migrate into lower areas on the wood surface, such as imperfections (scratches, chips, etc.). This migration creates dull spots in the polished surface, or mottling. To prevent this migration, wax is added to anchor the silicone molecules to the surface. Ratios of emulsified wax:silicone oil as high as 1:1 have been used to anchor the silicone. However, the emulsified wax contains solid discrete particles which decrease the clarity of the resulting film or finish, and the hardness of the wax particles increases the amount of time and effort to buff the film to a shine.

Additionally, wax-containing formulations are more costly to produce because the wax must be heated to ensure it is adequately incorporated into the furniture polish composition.

Another feature of furniture polish that is important to consumers is ease of application, or spreadability. Polishes which are difficult or time consuming to apply uniformly are not desirable. Wax-containing polishes frequently suffer from this phenomenon.

Furniture polish is also expected to provide a shine to the treated surface. Polish compositions providing high shine or high gloss are viewed favorably by the consumer. Those compositions which can maintain the shine or gloss over time are most preferred.

Conventional silicone containing furniture compositions often create an undesirable greasy or oily-feeling surface.

To achieve the goals desired by consumers and to overcome the disadvantages of the prior art, we have discovered furniture polish compositions which provide long-lasting, high gloss; are resistant to smears and heal smears quickly; and are resistant to mottling and are easy to apply. These compositions also provide a cleaner feeling surface. These compositions can also be wax-free, thus decreasing manufacturing costs.

It is therefore an object of our invention to provide a silicone-based, wax-free furniture polish composition.

It is a further object of our invention to provide a furniture polish composition that is resistant to smears and heals smears rapidly.

Yet another object is to provide an easy-to-use furniture polish which results in a high gloss, long-lasting shine and a cleaner feeling surface.

SUMMARY DISCLOSURE OF INVENTION

We have discovered furniture polish compositions with improved smear resistance and recovery, high gloss, long-lasting shine, easy application, clean feeling surface and resistance to mottling. These compositions comprise 1) a low-viscosity silicone fluid and either or both of: 2) a silicone gum; and 3) a polydiorganosiloxane which may be terminated with hydroxyl, methyl, alkoxy or vinyl groups. Suitable surfactants and solvents are also used. Other ingredients known to furniture polish formulators such as propellants, fragrance, colors, and preservatives may be added as desired or needed.

Our invention may be further described by reference to the following three exemplary embodiments.

The first embodiment is an oil-in-water formulation which may be either a liquid or an aerosol composition. This formulation comprises an oil-in-water surfactant, a silicone gum, a low-viscosity silicone fluid, a polydiorganosiloxane, a hydrocarbon solvent, a hydrocarbon propellant (if desired) and water.

The second embodiment is a water-in-oil formulation which also may be either a liquid or an aerosol composition. This composition comprises a water-in-oil surfactant and a low viscosity silicone fluid. One of: a) a silicone gum; and b) a polydiorganosiloxane or both of these compounds may be added to this composition. A hydrocarbon solvent, a hydrocarbon propellant (if desired) and water are also included.

The third embodiment is a lotion formulation. This composition may be made into an aerosol. Included in this third embodiment are water-in-oil surfactants, a low viscosity silicone fluid, a polydiorganosiloxane, a silicone gum, a hydrocarbon solvent, a propellant (if desired) and water. Oil-in-water surfactants may also be added as needed.

In each embodiment described above, fragrance, color, preservative, resin or other conventional ingredients known in the furniture polish art can be added as desired.

MODES FOR CARRYING OUT THE INVENTION

While we have described three embodiments of our invention, it is not limited to these examples, as one of ordinary skill in the art can readily develop other suitable formulations. The present disclosure should therefore be considered to exemplify the invention, and not as a limitation to the specifically described embodiments.

Our invention is a furniture polish composition comprising a low viscosity silicone fluid and, either one or both of, a silicone gum and a polydiorganosiloxane.

Low-Viscosity Silicone Fluids

The low viscosity silicone fluids useful in the present invention have viscosities of about 5 to about 5,000 centistokes, preferably about 10 to 20 centistokes. Suitable silicones may be used either "neat" ("stripped") or "unstripped". Unstripped silicones contain lower viscosity, lower molecular weight volatile fractions in addition to the primary siloxane. A stripped silicone contains essentially no lower viscosity, volatile fraction. Either a stripped or unstripped composition can be used in the present invention.

Unstripped silicones have the added advantage of being less costly than stripped silicones. They also enhance the performance of the furniture polish by making it easier to wipe and by providing a drier film. Nonetheless, stripped silicones with the appropriate viscosity can be used to provide a furniture polish with good performance.

Silicones useful in the present invention can be substituted with any organo-group known in the silicone art, provided the silicones are not toxic. In addition to utility, economic considerations play a part in formulation. For example, while a phenylmethyl silicone is within the scope of our invention, its cost makes it unlikely to be used on a commercial scale.

Suitable, unstripped silicone fluids include polydimethylsiloxanes and can be purchased, for example, from Wacker Silicones Corporation. Particularly suitable is Silicone Fluid EF 139409 (10 centistokes, unstripped) and SILICONE FLUID F-1079 (20 centistokes, unstripped).

Silicone Gums

Silicone gum normally refers to a high molecular weight linear polysiloxane or silicone that can be converted from its highly plastic state into the predominantly elastic state by cross-linking.

Silicone gums suitable for use in the present invention are polysiloxane and/or silicones which may be terminated, for example, with hydroxyl, dimethyl, methylvinyl or vinyl groups. Suitable gums exist in the form of high viscosity liquids which are not readily flowable. Viscosities of about 11 to 16 million centistokes are typical. A particularly suitable silicone gum is sold by Wacker Silicones Corporation under the trade name EL POLYMER V-1200A US.

Using a silicone gum that is in the liquid state, rather than a silicone material or wax in a solid state has numerous advantages. First, a solid, or particulate silicone or wax would interfere with numerous preferred forms of furniture polish delivery. For example a solid silicone particle 30 m in size would clog a conventional aerosol and valve or trigger nozzle. Even a particle as small as 0.3 m may cause problems by agglomerating, thus clogging the nozzle or valve. Settling of silicone or wax particles upon storage decreases shelf life. Further, less energy is required to disperse a liquid or gel silicone gum used in the present invention as compared with a solid material, thus reducing manufacturing costs.

While not wishing to be bound to any theory, it is believed that the silicone gum serves to anchor the low viscosity silicone or polydiorganosiloxane and thereby prevents or reduces the mottling phenomenon.

Polydiorganosiloxane

The third silicone component of the furniture polish of the invention is a polydiorganosiloxane, which may be terminated with groups such as hydroxyl, methyl, alkoxy and vinyl groups.

As with the low viscosity silicone fluid, the organo-group in the polydiorganosiloxane can be any organo-group known in the silicone art, provided the polydiorganosiloxane is not toxic. Again, economic considerations play a role in selecting appropriate compounds.

Viscosities of about 1,000 to about 20,000 centistokes or more are suitable, with viscosities of about 2,000–6,000 centistokes preferred The hydroxyl terminated polydimethylsiloxane is preferred and may also be purchased from Wacker Silicones Corporation under the name ELASTOMER 6N.

Unlike prior art furniture polish compositions, furniture polishes according to the present invention do not require a wax to anchor the silicone because all the film forming materials are compatible with and soluble in each other. It is believed this compatibility results in improved film clarity and better ease of use because there are no discrete wax particles out of solution.

Manufacturing costs are reduced because, unlike conventional wax-containing furniture polishes, minimal heat is required to blend the components.

As noted previously, furniture polish compositions in accordance with this invention may also include any or all of the following: oil-in-water and water-in-oil surfactants, hydrocarbon solvents, water, and other optional ingredients, such as preservatives, colors, resins and fragrance.

Solvents

Those skilled in the art know that solvents are typically utilized in conventional polish compositions for purposes of removing solvent-soluble residues from substrate surfaces. For optimum results, therefore, any solvents that are utilized in preparing the emulsion polish compositions of this invention should be sufficiently volatile so as to bring about rapid drying after the composition has been applied to a substrate surface, and yet, not so volatile as to prematurely dry up before desired spreading of the composition onto the substrate surface (for purposes of providing a desired film) has taken place.

Accordingly, certain solvents deemed particularly useful, in accordance with the principles of our present invention, have so-called "kauri-butanol" values of from about 20 to about 50, and have boiling-point ranges of from about 60 degrees Celsius ("C.") to about 210° C. and preferably from about 95° C. to about 150° C.

A wide variety of commercially-available isoparaffinic hydrocarbon solvents, such as those commercially available from the Exxon Corporation under the "Isopar" brand as well as the isoparaffinic-type hydrocarbon solvents commercially available from the Phillips Petroleum Corporation under the "Soltrol" brand, are moreover presently preferred because they are substantially odor-free.

Other suitable hydrocarbon solvents, in accordance with the principles of our present invention, include pentane, hexane, heptane and the so-called "Stoddard" solvents.

The various above-described hydrocarbon solvents, furthermore, can be utilized individually or in combination.

Surfactants

The polish compositions of our present invention can be either oil-in-water (i.e. so-called "water out") emulsions or water-in-oil (i.e. so called "oil out") emulsions. Those skilled in the art can readily choose an appropriate surfactant (or emulsifier) or combination of surfactants (or emulsifiers), to produce the desired type of emulsion.

As those skilled in the art can well appreciate, the term "emulsion" is generally recognized as connoting a stable mixture of two or more mutually immiscible liquids held in suspension by small percentages of substances called emulsifiers (or surfactants). All emulsions, moreover, are characterized as comprising a continuous phase and a discontinuous phase which is dispersed throughout the continuous phase.

Still more particularly, in the formulation of the various emulsion polish compositions of the present invention, the various solvents and optional surfactants described below are typically those conventionally used in furniture polish compositions.

Accordingly, surfactants (or emulsifiers) useful for purposes of the present invention include conventional non-ionic, cationic, and anionic surfactants (or emulsifiers) commonly employed in commercial polishes for applications to furniture surfaces. Such conventional surfactants can be used alone or in combination.

Thus, in certain preferred embodiments of our present invention, certain conventional non-ionic surfactants, as well as certain combinations of conventional non-ionic surfactants, are optionally utilized because they provide certain desirable emulsion-stability properties. Conventional optional non-ionic surfactants for emulsifiers, suitable for purposes of our present invention, accordingly include, but are not limited to, the so-called "sorbitan" esters of oleic and lauric acids, those polyethoxylated sorbitan esters having up to 20 ethoxy units: the monoglycerides and diglycerides of the fat-forming fatty acids, and combinations thereof.

Additional examples of optionally preferred, commercially-available non-ionic surfactants (or emulsifiers) include certain "Span" brand and "Tween" brand emulsifiers, both presently available from ICI Americas, Inc.; and the "Monamid" brand emulsifiers, presently available from Mona Industries, Inc. Particular examples of such emulsifiers include sorbitan monooleate, sold by ICI Americas, Inc. under the "SPAN 80" brand: sorbitan monolaurate, sold by ICI Americans, Inc. under the "SPAN 20" brand; and sorbitan monopalmitate, sold by ICI Americas, Inc. under the "SPAN 40" brand. Mixtures of the various above-mentioned optional surfactants (or emulsifiers) can also be utilized, if desired, in accordance with the principles of our present invention.

It is, accordingly, further presently believed that the following conventional cationic surfactants or emulsifiers would be suitable for purposes of our present invention. These include certain quaternary ammonium compounds such as the quaternary ammonium halides, the quaternary ammonium sulfates, those so-called "fatty" amines which are ethoxylated and have about 2 to about 10 moles of ethylene oxide, and the chloride salts or acetate salts of such amines, as well as those amines which are ethoxylated and have 2 or more moles of ethylene oxide. Various mixtures or combinations of the above-noted optional surfactants (or emulsifiers) can also be utilized by those skilled in the art, in accordance with the principles of our invention, if desired.

Conventional optional anionic surfactants or emulsifiers, suitable for purposes of our present invention, include certain sulfates (such as sodium lauryl sulfate, and the sodium alkyl ether sulfates), those sulfosuccinates containing polyethylene glycol moieties attached thereto, as well as the alkyl aryl sulfonates. Mixtures of the above optional surfactants (or emulsifiers) can also be utilized, in accordance with the principles of our present invention if desired.

Optional Ingredients

As was implied above, the most preferred emulsion polish compositions of this invention are totally wax-free. However, it may be desirable, in certain situations, to utilize a relatively minor amount of wax in specific formulations. Thus, from about 0.05 to about 2.0 weight-percent wax, preferably from about 0.05 to about 0.5 weight percent wax based upon total weight of the emulsion polish composition, may optionally be employed in the furniture polish compositions of our present invention. Conventional waxes, suitable for purposes of our invention, accordingly include, but are not limited to, certain synthetic waxes such as the microcrystalline waxes and the petroleum waxes as well as certain natural waxes such as the so-called "candellila" and "carnauba" waxes.

Still other well-known additives, including but not limited to perfumes and preservatives such as formaldehyde, may optionally be added to the emulsion polish compositions of our present invention.

Perfumes are typically added, for example, to import a desired fragrance. Conventional perfumes, suitable for purposes of our present invention, are well known to those skilled in the art and accordingly need not be described in detail here. The amount of perfume which is included is typically present in an mount that is effective for imparting a desired fragrance intensity. Such an amount of perfume can range, for example, from about 0.05 to about 1 weight of the emulsion polish composition (exclusive of any propellant, if present).

Preservatives, typically formaldehyde, are generally utilized to retard and otherwise thwart bacterial activity within packages containing certain formulations of the emulsion polish compositions of our present invention. As those skilled in the art can appreciate, the presence of such preservatives is for prolonging the shelf life of the emulsion polish composition. A variety of well-known conventional quaternary compounds can moreover be utilized for such a purpose.

Furthermore, the emulsion polish compositions of our present invention can be applied directly onto a substrate surface, utilizing e.g. a wide variety of well-known conventional pressurized systems containing an appropriate amount of a liquid or gaseous propellant. In particular, the emulsion polish compositions can be applied directly onto a substrate surface, utilizing well-known spray means such as conventional pump sprayers. Additionally, the emulsion polish compositions can be applied to furniture surfaces, utilizing a polishing cloth, or other suitable means. Still further, the furniture polish compositions can be incorporated into articles of manufacture—such as absorbent cloths—if desired. See, e.g. U.S. Pat. No. 3,965,518 to Muoio.

Moreover, as was briefly implied above, the emulsion polish composition of our present invention can be provided in aerosol form. To produce such an aerosol form, the emulsion polish composition is typically introduced into a conventional aerosol container which is then capped with an aerosol valve. Thereafter, an effective amount of a suitable, conventional propellant is introduced into the aerosol container, in a known manner, for achieving a desired pressure in the container. Such propellant pressure should therefore be sufficient for enabling substantially complete expulsion of the contents of the aerosol container in the form of a spray in the desired manner, through the aerosol valve. Any of a wide variety of suitable conventional propellants which may be used include such well-known liquified hydrocarbons propellant gases as isobutane, n-butane and propane, and various mixtures of these. Additional illustrative propellants include, for example, carbon dioxide and/or nitrogen.

Moreover, the precise method of manufacturing the polish compositions of this invention is not critical. The order and/or manner of addition of the various emulsion polish composition ingredients, mentioned above, may accordingly generally be varied and typically will not affect the quality of a particular emulsion polish composition which is thus being formulated or produced. Conventional techniques for forming water-in-oil and oil-in-water emulsion polishes are typically used to produce the various embodiments of the emulsion polish compositions of our present invention.

Our invention will now be described in more detail with reference to specific examples of each embodiment.

The examples of this application use the following ingredients:

Isopar E® and Isopar D®, which are both isoparaffinic hydrocarbon solvents available from the Exxon Corp.

Span 20®, sorbitan monolaurate and Span 80®, sorbitan monooleate, Tween 20®, polyoxyethylene sorbitan monolaurate, all available from ICI Americas, Inc.

BTC 2125 M, alkyldimethylbenzyl ammonium chloride, dimethyl ethylbenzyl ammonium chloride, available from Stepan Chemical Corp. or Onyx Chemical Corp.

Hercules Piccotex LC resin, a monomer hydrocarbon resin available from Hercules, Inc.

EL-Polymer V-1200A US silicone gum is a dimethyl, methyl vinyl, and vinyl terminated mixture of siloxane and silicones sold by Wacker Silicones Corp.

EF 139409 is an unstripped 10 Cstk silicone fluid, and silicone Fluid F-1079 is an unstripped 20 Cstk silicone fluid containing polydimethylsiloxane and octamethylcyclotetrasiloxane available from Wacker Silicones Corp.

Elastomer 2N and Elastomer 6N are polydimethylsiloxanediols with viscosities of 2,000 and 6,000 centistokes respectively, available from Wacker Silicones Corp.

Of course, these ingredients are merely exemplary of the kinds of ingredients which are suitable for use in the present invention, and are not intended to limit the scope of the invention. Substitution or addition of other suitable materials is within the scope of our invention.

Oil-in-Water Furniture Polish

Referring again now to the first embodiment, an oil-in-water furniture polish composition can be prepared using an oil-in-water surfactant, a silicone gum, a low viscosity silicone fluid, a polydiorganosiloxane, a hydrocarbon solvent and water. This composition is in the form of a liquid.

More particularly, the oil-in-water furniture polish contains about 0.05% to 5.00%, preferably about 0.40–1.00% of an oil-in-water surfactant; about 0.01–1.00%, preferably 0.10–0.30% of a silicone gum; about 0.3–50.0%, preferably about 6.3–12.0% of an unstripped low viscosity silicone fluid; about 0.2–5.0%, preferably about 0.7–1.30% of a polydiorganosiloxane; about 0–25%, preferably about 3.0–7.0% of a hydrocarbon solvent, with the balance being water.

The above liquid furniture polish composition can also be made in aerosol form by the addition of about 5.0–25.0%, preferably about 8.0–10.0% of a hydrocarbon propellant to the liquid composition described above. In the event a hydrocarbon propellant is used, the amount of hydrocarbon solvent in the liquid composition can be adjusted downward, as recognized by those skilled in the art. Other suitable propellants include hydrocarbon propellants, compressed gases, dimethyl ether and non-ozone depleting hydrofluorocarbons.

An oil-in-water furniture polish in accordance with the present invention is found in the following two examples:

EXAMPLE 1

| Ingredient | % |
|---|---|
| Hydrocarbon solvent[1] | 7.000 |
| Oil-in-Water Surfactant[2] | 0.300 |
| Unstripped 20 Cstk Silicone[3] | 7.800 |
| Silicone gum[4] | 0.200 |
| Lemon fragrance | 0.350 |
| Water | 83.650 |
| Oil-in-Water Surfactant[5] | 0.300 |
| Formaldehyde 37% | 0.250 |
| Antimicrobial Preservative[6] | 0.150 |

[1]Isopar E ®;
[2]Span 20;
[3]Unstripped Silicone Fluid 1079;
[4]EL Polymer V-1200A US ®;
[5]Tween 20; and
[6]BTC 2125M.

The above ingredients were formulated into a liquid furniture polish in the following manner:

The water, second surfactant, formaldehyde and BTC 2125M were charged into a full capacity vessel and mixed to uniformity at room temperature to form an aqueous solution.

The remaining ingredients, i.e., the hydrocarbon solvent, the first surfactant, the low-viscosity silicone and silicone gum and fragrance are charged into a separate vessel. This mixture is then charged into the vessel containing the aqueous solution at room temperature with agitation.

The combined ingredients were homogenized in a Gaulin piston homogenizer from Gaulin Corp. at 8,000 PSIg (55160 kPa).

The resulting furniture polish provided a very high gloss level, low smear levels and was very easy to use.

EXAMPLE 2

| Ingredient | % |
| --- | --- |
| Hydrocarbon solvent[1] | 7.00 |
| Oil-in-Water Surfactant[2] | 0.30 |
| Unstripped 20 Cstk Silicone[3] | 4.35 |
| Resin[4] | 0.25 |
| Polydiorganosiloxane[5] | 0.60 |
| Fragrance | 0.35 |
| Water | 86.25 |
| Formaldehyde 37% | 0.25 |
| Antimicrobial preservative[6] | 0.15 |
| Oil-in-Water Surfactant[7] | 0.30 |
| Silicone Gum[8] | 0.20 |

[1]Isopar D ®;
[2]Span 20;
[3]Unstripped Silicone Fluid F-1079;
[4]Hercules Piccotex LC Resin;
[5]Elastomer 2N;
[6]BTC 2125 M;
[7]Tween 20; and
[8]EL POLYMER V-1200A US.

A furniture polish composition containing the above ingredients was formulated by combining the hydrocarbon solvent, the first surfactant, the low viscosity silicone fluid, the resin, the polydiorganosiloxane, the fragrance and the silicone gum to a vessel where all ingredients were mixed to uniformity at room temperature. The resin was first added to the hydrocarbon solvent, with heat to solubilize. The silicone gum was likewise pre-cut into the low-viscosity silicone fluid to solubilize, prior to addition to the mixture.

The water, second surfactant and formaldehyde were combined and mixed to uniformity in a separate vessel. The ingredients from the first vessel were then added with agitation at room temperature. The combined mixture is then homogenized at 8,000 PSIg (55160 kPa) in a Gaulin piston homogenizer.

The resulting furniture polish provided good gloss and a very low smear rate.

Water-in-Oil Furniture Polish

A water-in-oil liquid furniture polish may also be made in accordance with the second embodiment of the present invention.

Such a composition contains about 0.05 to 5.0%, preferably about 0.3–1.2% of a water-in-oil surfactant; about 0.5–50.0%, preferably about 6.3–12.0% of a low-viscosity silicone; about 0–25.0%, preferably about 8.0–16.0% of a hydrocarbon solvent; about 5.0–25.0%, preferably about 8.0–12.0% of a hydrocarbon propellant (if desired); with the balance being water.

This water-in-oil polish also contains either a silicone gum or a polydiorganosiloxane, or both of these. The silicone gum, when used, is present in amounts of about 0.01–1.00%, preferably about 0.1–0.3%. The polydiorganosiloxane, when used, is present in amounts of about 0.2–5.0%, preferably about 0.7–1.3%. Thus, water-in-oil furniture polishes containing 1) a low viscosity silicone fluid and a silicone gum; 2) a low viscosity silicone fluid and a polydiorganosiloxane; and 3) a low viscosity silicone fluid, a silicone gum and a polydiorganosiloxane all fall within the scope of this embodiment.

Fragrance, color, preservatives or additives may also be used.

Examples 3, 4 and 5 in accordance with this embodiment are described below.

EXAMPLE 3

The following formulation was utilized in a consumer test. It contains no silicone gum.

| Ingredient | % |
| --- | --- |
| Surfactant[1] | 0.70 |
| Formaldehyde | 0.25 |
| Unstripped 10 centistoke silicon fluid[2] | 7.00 |
| Polydiorganosiloxane[3] | 1.00 |
| Hydrocarbon solvent[4] | 10.00 |
| Fragrance | 0.40 |
| Water | 80.65 |

[1]Span 80;
[2]Silicone F-1079;
[3]Elastomer 6N; and
[4]Isopar D.

All materials, except the formaldehyde and water are cold-blended to uniformity. The water was then heated to 100° F. (37.8° C.), followed by formaldehyde addition. With strong agitation, the water solution was slowly added to the remaining ingredients with continued agitation (5 minutes). Ninety percent of the above composition can be added to 10% of a propellant to prepare an aerosol formulation.

The above furniture polish formulation was subject to side-by-side consumer tests with a leading wax and polydimethylsiloxane-containing furniture polish composition which contained no low-viscosity silicone, no polydiorganosiloxane of the type used herein, and no silicone gum. Consumers were asked to apply each polish to a wood table and evaluate several aspects of its performance.

This test demonstrated that consumers preferred, at a 95% confidence level or higher, the composition according to the present invention over the nationally known, commercially available product in all areas evaluated, including ease of application, smear resistance and healing, and quality of shine.

The following formula was also subjected to a side-by-side consumer test with the commercially available furniture polish, and was found, at the 95% confidence level or higher, to be more resistant to smears, to heal smears quicker, and to provide an improved shine.

EXAMPLE 4

| Ingredient | % |
| --- | --- |
| Water-in-Oil Surfactant[1] | 0.70 |
| Formaldehyde | 0.25 |
| Unstripped 20 centistoke silicone[2] | 12.00 |
| Silicone gum[3] | 0.20 |
| Hydorcarbon solvent[4] | 4.00 |
| Hydrocarbon solvent[5] | 7.50 |
| Fragrance | 0.40 |
| Water | 74.95 |

[1]Span 80;
[2]Silicone F-1079;
[3]EL POLYMER V-1200A US;
[4]Isopar E; and
[5]Isopar D.

To prepare this furniture polish composition, the silicone gum was added to the Isopar E® at room temperature with high shear agitation. These two ingredients were agitated to solution. The remaining materials, except the water and formaldehyde, were then added and cold blended to uniformity.

The water was heated to 110° F. (43° C.) then the formaldehyde was added. This aqueous solution was then slowly added to the other mixture, with continued agitation for five minutes.

Ninety percent of this composition can be combined with 10% of a propellant and used as an aerosol composition.

EXAMPLE 5

This Example is a formulation containing all three silicone components: 1) low viscosity silicone fluid; 2) silicone gum; and 3) polydiorganosiloxane.

| Ingredient | % |
| --- | --- |
| Water-in-oil surfactant[1] | 0.70 |
| Formaldehyde 37% | 0.25 |
| Unstripped 20 centistoke silicone fluid[2] | 7.00 |
| Silicone gum[3] | .02 |
| Polydiorganosiloxane[4] | 1.00 |
| Resin[5] | .28 |
| Hydrocarbon solvent[6] | 10.00 |
| Fragrance | 0.40 |
| Water | 80.35 |

[1]Span 80;
[2]Silicone F-1079;
[3]EL POLYMER V-1200A US;
[4]Elastomer 2N;
[5]Hercules Piccotex LC Resin; and
[6]Isopar D ®.

This polish can be made using the process steps described in the previous examples.

Lotion Furniture Polish

A third embodiment of the present invention is a lotion formulation which may be made in the form of an aerosol. Such formulation typically contains about 0.05–5.0%, preferably about 0.2–1.5% water-in-oil surfactants; about 0.5–50.0%, preferably about 20–35% of a low viscosity silicone fluid; about 0.01–1.00%, preferably about 0.1–0.3% of a silicone gum; about 0–25.0%, preferably about 2.0–10.0% of a hydrocarbon solvent; 0–25.0%, preferably about 3.0–8.0% of a propellant (if desired), and water to make up the balance. As is well known in the art, small amounts of oil-in-water surfactants, e.g. about 0.01–1.0%, preferably about 0.02–0.1%, may be optionally added to aid emulsion stability. Fragrance, color and preservative can be added as desired.

Suitable propellants include hydrocarbon propellants, compressed gases, dimethyl ether and non-ozone depleting hydrofluorocarbons.

The preferred aerosol package for this product would be a bi-compartmentalized aerosol container where the propellant is separated from the intermediate, but is not limited to this type of aerosol delivery system. Examples of suitable packages include Sepro, C.M.B. bi-can, or piston-type units.

The lotion formula can also be packaged as a non-aerosol product without the propellant, and delivered from a bottle, tube or pouch.

EXAMPLE 6

A lotion furniture polish in accordance with the claimed invention has the following formula:

| Ingredient | % |
| --- | --- |
| Water-in-Oil Surfactant[1] | 0.70 |
| Formaldehyde 37% | 0.20 |
| Hydrocarbon solvent[2] | 5.00 |
| Water | 73.50 |
| Fragrance | 0.40 |
| Unstripped 10 centistoke silicone[3] | 20.00 |
| Silicone gum[4] | 0.20 |

[1]Span 80;
[2]Isopar D;
[3]EF-139409; and
[4]EL Polymer V-1200A US.

The silicone gum and hydrocarbon solvent were charged to a vessel and agitated until the silicone gum was dissolved in the solvent at a temperature in excess of 40° F. (4.44° C.).

The surfactant, low viscosity silicone and fragrance were combined with the ingredients and agitated to uniformity.

The formaldehyde and water were charged to a separate vessel at room temperature. The water solution was then slowly added to the other mixture with rapid agitation. Additional baffling may be needed to insure adequate mixing to make sure a homogeneous solution results. Formulation at a temperature above 40° F. (4.44° C.) is recommended to obtain a stable lotion.

INDUSTRIAL APPLICABILITY

The above compositions are described for purposes of illustration only and any type of formulation known in the art can be made using this technology including creams, lotions, liquids, and aerosols. Delivery systems are also those known in the art and include bottles, pouches, cans, trigger or pump sprays, aerosol cans, and impregnated porous substrates.

What we claim is:

1. A furniture polish comprising: 1) a mixture of polydimethylsiloxane and octamethylcyclotetrasiloxane with a viscosity of about 10–20 centistokes; 2) polydimethylsiloxanediol with a viscosity of about 4,000–6,000 centistokes; and 3) water.

2. A furniture polish comprising: 1) a mixture of polydimethylsiloxane and octamethylcyclotetrasiloxane with a viscosity of about 10–20 centistokes; 2) a silicone gum containing a mixture of dimethyl, methylvinyl, and vinyl terminated siloxanes and silicones; and 3) water.

3. The furniture polish of claim 2 additionally containing a polydimethylsiloxanediol with a viscosity of about 2,000–6,000 centistokes.

4. An oil-in water furniture polish comprising about 0.05% to 5.00% of an oil-in-water surfactant; 0.01–1.00% of a silicone gum; about 0.3–50.0% of a low viscosity silicone fluid; about 0.2–5.0% of a polydiorganosiloxane; about 0–25% of a hydrocarbon solvent, and the balance being water.

5. The furniture polish of claim 4 including a propellant for aerosol delivery of the polish.

6. The furniture polish according to claim 4 where the low viscosity silicone has a viscosity of about 10–20 centistokes.

7. The furniture polish according to claim 4 where the low viscosity is a mixture of polydimethylsiloxane and octamethyltetrasiloxane.

8. The furniture polish according to claim 4 where the silicone gum is a mixture of dimethyl, methylvinyl and vinyl terminated siloxanes and silicones.

9. The furniture polish according to claim 4 where the polydiorganosiloxane is polymethylsiloxanediol.

10. The furniture polish according to claim 4 where the polydiorganosiloxane has a viscosity of about 2,000–6,000 centistokes.

11. A lotion furniture polish comprising 0.05–5.0% of a water-in-oil surfactant; about 0.5–50.0% of a low viscosity silicone fluid; about 0.01–1.00% of a silicone gum; about 0–25.0% of a hydrocarbon solvent; about 0.02–0.1% of an oil-in-water surfactant; and the balance being water.

* * * * *

UNITED STATES PATENT AND TRADEMARK OFFICE
CERTIFICATE OF CORRECTION

PATENT NO. : 5,681,377
DATED : October 28, 1997
INVENTOR(S) : Robert H. Lohr, et al.

It is certified that error appears in the above-identified patent and that said Letters Patent is hereby corrected as shown below:

Column 1, line 8, please substitute "dreams" with --creams--

Column 1, line 20, please substitute "fill" with --film--

Column 6, line 54, please substitute "an mount" with --an amount--

Column 4, line 11, please substitute "30 m" with --30 µm--

Column 4, line 13, please substitute "0.3 m" with --0.3 µm--

Signed and Sealed this

Seventeenth Day of April, 2001

Attest:

NICHOLAS P. GODICI

*Attesting Officer*     *Acting Director of the United States Patent and Trademark Office*